(12) United States Patent
Thompson et al.

(10) Patent No.: US 12,141,727 B1
(45) Date of Patent: Nov. 12, 2024

(54) SYSTEMS AND METHODS FOR INTELLIGENTLY SEEDING A FORMULATION NETWORK MODEL

(71) Applicant: Turing Labs, Inc., New York, NY (US)

(72) Inventors: Michael L. Thompson, Cincinnati, OH (US); Manmit Shrimali, Oakville (CA)

(73) Assignee: Turing Labs, Inc., New York, NY (US)

(*) Notice: Subject to any disclaimer, the term of this patent is extended or adjusted under 35 U.S.C. 154(b) by 0 days.

(21) Appl. No.: 18/680,620

(22) Filed: May 31, 2024

Related U.S. Application Data

(60) Provisional application No. 63/533,140, filed on Aug. 17, 2023.

(51) Int. Cl.
*G06F 40/40* (2020.01)
*G06Q 10/0631* (2023.01)

(52) U.S. Cl.
CPC ....... *G06Q 10/06313* (2013.01); *G06F 40/40* (2020.01)

(58) Field of Classification Search
CPC .......................... G06Q 10/06313; G06F 40/40

USPC ............................................................ 704/9
See application file for complete search history.

(56) References Cited

U.S. PATENT DOCUMENTS

2017/0270105 A1* 9/2017 Ninan .................... G06F 40/56

* cited by examiner

*Primary Examiner* — Thierry L Pham
(74) *Attorney, Agent, or Firm* — Padowithz Alce; Alce PLLC

(57) ABSTRACT

A computer-implemented method for generating natural language explanations of product formulations includes implementing a causal-based formulation network model within a web-based graphical, activating a target causal path of the causal-based formulation network model based on subscriber input; constructing a formulation impact explanation prompt based on a formulation outcome node and a sequence of interconnected formulation parameter nodes of the target causal path; generating, by a large language model, a natural language explanation of the target causal path based on an input of the formulation impact explanation prompt; and surfacing, by the web-based graphical user interface, the natural language explanation of the target casual path.

20 Claims, 6 Drawing Sheets

FIGURE 4

| | 0. Inputs: Ingredients & Test/Processing Conditions | 1. Composition: Benchmark compositional abstracts (i.e. fat fraction, particle size, etc.) | 2. Phenomena: Physical behavior, e.g. physics, chemistry, biology, morphology/structure | 3. Performance: Multi-phenomenological function efficacy (e.g. stain removal) | 4. Benefit Delivery: Physical result of multiple phenomena to deliver a benefit dimension | 5. Benefit Assessment: Psychological assessment of the presence of a benefit dimension | 6. Satisfaction: Psychological assessment of the overall multi-benefit experience, e.g. Liking/Overall Rating |
|---|---|---|---|---|---|---|---|
| Group Name | | | | | | | |
| Computed Quantities — total_expct | L0_input | L1_cmpstn | L2_phnm | L3_prfmnc | L4_effcy | L5_assmnt | L6_stsfctn |
| Chemistry — chem_equil | | | | | | | |
| Chemistry — chem_prsrv | | | | | | | |
| Biology — biol_microb | | | | | | | |
| Morphology — morph_phase | | | | | | | |
| Morphology — morph_flow | | | | | | | |
| Sensorial Taste — taste_flavor | | | | | | | |
| Sensorial Smell | | | | | | | |
| Sensorial Touch — feel_creamy | | | | | | | |
| Sensorial Sight — sight_hueschroma | | | | | | | |
| Sensorial Sight — sight_lightness | | | | | | | |
| Sensorial Sound | | | | | | | |

GROUP: Phenomenological/Functional

FIGURE 5

SYSTEMS AND METHODS FOR INTELLIGENTLY SEEDING A FORMULATION NETWORK MODEL

CROSS-REFERENCE TO RELATED APPLICATIONS

This application claims the benefit of U.S. Provisional Application No. 63/533,140, filed 17 Aug. 2023, which is incorporated in its entirety by this reference.

TECHNICAL FIELD

This invention relates generally to the product formulation technology field, and more specifically to a new and useful formulation network model in the product formulation technology field.

BACKGROUND

Modern product formulation may be complex and obfuscated, which may create several challenges in product formulation and product experimentation. In particular, institutional knowledge of formulation data for a given product is often distributed in some known and unknown spaces. Additionally, formulation knowledge of expert formulators may not be memorialized in a manner that can be easily transferable into new product formulations.

Accordingly, the disconnect in sources of institutional formulation knowledge creates formulation data gaps, formulation data anomalies, and formulation data conflicts that reduce efficiencies, accuracies, and the quality of product formulations without a single source of truth for formulation data.

Thus, there is a need in the product formulation technology to create improved systems and methods for generating an integrated formulation network model that provides a comprehensive reference structure and advanced formulation tool.

The embodiments of the present application described herein provide technical solutions that address at least the need described above.

BRIEF SUMMARY OF THE INVENTION(S)

In some embodiments, a computer-implemented method for generating natural language explanations of product formulations includes implementing a causal-based formulation network model within a web-based graphical user interface of a formulation service, wherein the causal-based formulation network model comprises product formulation knowledge data that establishes a plurality of causal paths between a plurality of formulation parameter nodes and a plurality of formulation outcome nodes across a diverse set of product categories; activating a target causal path of the causal-based formulation network model based on subscriber input, wherein the target causal path includes: (I) a formulation outcome node that represents a desired formulation outcome of a target physical product, and (II) a sequence of interconnected formulation parameter nodes upstream of the formulation outcome node that each relate to a distinct formulation parameter that impacts the desired formulation outcome of the target physical product; constructing a formulation impact explanation prompt based on the formulation outcome node and the sequence of interconnected formulation parameter nodes of the target causal path; generating, by a large language model, a natural language explanation of the target causal path based on an input of the formulation impact explanation prompt; and surfacing, by the web-based graphical user interface, the natural language explanation of the target casual path, wherein the natural language explanation describes in a formulation-specific manner how changes to one or more formulation parameter nodes of the sequence of interconnected formulation parameter nodes impacts the desired formulation outcome of the target physical product.

In some embodiments, the computer-implemented method further comprises: obtaining product formulation data comprising a plurality of formulation parameters and a plurality of formulation outcomes for the target physical product; automatically mapping each of the plurality of formulation parameters and each of the plurality of formulation outcomes to a distinct functional class-causal level correlation index of a multi-dimensional product-agnostic formulation backbone; and seeding the causal-based formulation network model based on: (A) functional class-casual level correlation indices mapped to the plurality of formulation parameters and the plurality of formulation outcomes, and (B) established causal relationships between the functional class-casual level correlation indices within the multi-dimensional product-agnostic formulation backbone.

In some embodiments, automatically mapping each of the plurality of formulation parameters and each of the plurality of formulation parameters includes: classifying, by one or more machine learning models, each of the plurality of formulation parameters and each of the plurality of formulation outcomes to a distinct functional class of the multi-dimensional product-agnostic formulation backbone, classifying, by one or more machine learning models, each of the plurality of formulation parameters and each of the plurality of formulation outcomes to a distinct casual level of the multi-dimensional product-agnostic formulation backbone, and mapping each of the plurality of formulation parameters and each of the plurality of formulation outcomes to the distinct functional class-causal level correlation index that interrelates the distinct functional class and the distinct casual level associated with each of the plurality of formulation parameters and each of the plurality of formulation outcomes.

In some embodiments, the multi-dimensional product-agnostic formulation backbone comprises: (i) a plurality of rows that each correspond to a distinct functional class of a plurality of functional classes, and (ii) a plurality of columns that each represent a causal level of a plurality of causal levels; and intersections between the plurality of rows and the plurality of columns form a plurality of functional class-causal level correlation indices.

In some embodiments, the plurality of casual levels of the multi-dimensional product-agnostic formulation backbone comprises: (a) a composition causal level, (b) a phenomena causal level positioned downstream from the composition causal level, (c) a performance causal level positioned downstream from the phenomena causal level, (d) a benefit delivery causal level positioned downstream from the performance causal level, (e) a benefit assessment causal level positioned downstream from the benefit delivery causal level, and (f) a satisfaction causal level positioned downstream from the benefit assessment causal level.

In some embodiments, the composition causal level stores formulation parameters of the plurality of formulation parameters that are deterministic and measurable, the phenomena causal level stores formulation parameters of the plurality of formulation parameters that are physically observed, the performance casual level stores formulation outcomes of the plurality of formulation outcomes that represent functional efficacy from combined phenomena, the benefit delivery causal level stores formulation outcomes of the plurality of formulation outcomes that represent use of multiple phenomena to deliver a distinct benefit dimension of a plurality of benefit dimensions, the benefit assessment causal level stores formulation outcomes of the plurality of formulation outcomes that represent psychological perception of one or more of the plurality of benefit dimensions, and the satisfaction causal level stores formulation outcomes of the plurality of formulation outcomes that represent overall user psychological assessment of the target physical product.

In some embodiments, the plurality of rows includes a computed quantities functional class row that stores formulation parameters of the plurality of formulation parameters that are derived by calculation or measurement, a chemistry functional class row that stores formulation parameters of the plurality of formulation parameters that relate to chemical properties of the target physical product, a biology functional class row that stores formulation parameters of the plurality of formulation parameters that are influenced by biological processes, a morphology functional class row that stores formulation parameters of the plurality of formulation parameters that relate to a physical structure of the target physical product, a taste functional class row that stores formulation parameters of the plurality of formulation parameters that represent odor properties of the target physical product, a touch functional class row that stores formulation parameters of the plurality of formulation parameters that represent tactile properties of the target physical product, a sight functional class row that stores formulation parameters of the plurality of formulation parameters that represent visual properties of the target physical product, and a sound functional class row that stores formulation parameters of the plurality of formulation parameters that represent auditory properties of the target physical product.

In some embodiments, the computer-implemented method further comprises receiving product formulation data uploaded by a subscriber, wherein the product formulation data comprises a plurality of formulation parameters and a plurality of formulation outcomes for the target physical product; obtaining an input selecting a user interface button displayed within the web-based graphical user interface; and automatically determining placement of the plurality of formulation parameters and the plurality of formulation outcomes within a multi-dimensional product-agnostic formulation backbone based on obtaining the input.

In some embodiments, the web-based graphical user interface displays the multi-dimensional product-agnostic formulation backbone and the placement determined for each of the plurality of formulation parameters and each of the plurality of formulation outcomes, and the web-based graphical user interface is configured to receive input for repositioning one or more of the plurality of formulation parameters and one or more of the plurality of the plurality of formulation outcomes within the web-based graphical user interface.

In some embodiments, the computer-implemented further comprises generating the causal-based formulation network model based on the placements of the plurality of formulation parameters and the plurality of formulation outcomes within the multi-dimensional product-agnostic formulation backbone; and dynamically updating the network model when one or more of the plurality of formulation parameters and one or more of the plurality of the plurality of formulation outcomes are repositioned within the web-based graphical user interface.

In some embodiments, dynamically updating the network model includes: adding one or more formulation parameter nodes to the causal-based formulation network model, removing a subset of the plurality of formulation parameter nodes from the causal-based formulation network model, adding one or more causal paths to the casual-based formulation work model, and removing a subset of the plurality of causal paths from the causal-based formulation network model.

In some embodiments, the multi-dimensional product-agnostic formulation backbone comprises a plurality of causal levels positioned along a first dimension and a plurality of functional classes positioned along a second dimension, and automatically determining placement of a target formulation parameter of the plurality of formulation parameters includes: extracting properties and relationships of the target formulation parameter from a pre-defined formulation lexicon; and classifying the target formulation parameter to a target functional class of the plurality of functional classes based on the properties and relationships extracted for the target formulation parameter; and classifying the target formulation parameter to a target causal level of the plurality of causal levels based on the properties and relationships extracted for the target formulation parameter.

In some embodiments, the multi-dimensional product-agnostic formulation backbone comprises a plurality of causal levels positioned along a first dimension and a plurality of functional classes positioned along a second dimension, and automatically determining placement of a target formulation outcome of the plurality of formulation outcomes includes: extracting properties and relationships of the target formulation outcome from a pre-defined formulation lexicon; and classifying the target formulation outcome to a target functional class of the plurality of functional classes based on the properties and relationships extracted for the target formulation outcome; and classifying the target formulation outcome to a target causal level of the plurality of causal levels based on the properties and relationships extracted for the target formulation outcome.

In some embodiments, the multi-dimensional product-agnostic formulation backbone comprises a plurality of causal levels positioned along a first dimension and a plurality of functional classes positioned along a second dimension, and automatically determining placement of a target formulation parameter of the plurality of formulation parameters includes: automatically determining, via the large language model, a target casual level of the plurality of causal levels for the target formulation parameter; and automatically determining, via the large language model, a target functional class of the plurality of functional classes for the target formulation parameter.

In some embodiments, automatically determining placement of a target formulation outcomes of the plurality of formulation outcomes includes automatically determining, via the large language model, a target casual level of the plurality of causal levels for the target formulation outcome; and automatically determining, via the large language model, a target functional class of the plurality of functional classes for the target formulation outcome.

In some embodiments, automatically determining the placement of the plurality of formulation parameters and the plurality of formulation outcomes at least includes: utilizing a classification algorithm to classify the plurality of formulation parameters into functional classes; and deriving likely phenomena affected by each functional class of ingredients based on outputs of the classification algorithm. In some embodiments, the computer-implemented method further comprises generating the causal-based formulation network model based on the placement of the plurality of formulation parameters and the plurality of formulation outcomes within the multi-dimensional product-agnostic formulation backbone, wherein generating the causal-based formulation network model at least includes: automatically constructing input-to-phenomena connections by associating the functional classes with corresponding likely phenomena; adding the input-to-phenomena connections to the causal-based formulation network model; and presenting the causal-based formulation network model, including the input-to-phenomena connections, within the web-based graphical user interface.

In some embodiments, each of the plurality of formulation parameters corresponds to a distinct ingredient used to create the target physical product, and each of the plurality of formulation outcomes is influenced by changes to the plurality of formulation parameters.

In some embodiments, the causal-based formulation network model includes the target causal path and a plurality of additional causal paths, and activating the target causal path includes increasing a prominence of the target causal path relative to the plurality of additional causal paths.

In some embodiments, the computer-implemented method further comprises: populating a multi-dimensional product-agnostic formulation backbone based on subscriber-uploaded formulation data, and seeding the causal-based formulation network model based on the populating of the multi-dimensional product-agnostic formulation backbone, wherein seeding the causal-based formulation network model transforms the causal-based formulation network model from a subscriber-agnostic causal-based formulation network model to a subscriber-specific causal-based formulation network model.

In some embodiments, a computer-program product comprises a non-transitory machine-readable storage medium storing computer instructions that, when executed by one or more processors, perform operations comprising: implementing a causal-based formulation network model within a web-based graphical user interface of a formulation service, wherein the causal-based formulation network model comprises product formulation knowledge that establishes a plurality of causal paths between a plurality of formulation parameter nodes and a plurality of formulation outcome nodes across a diverse set of product categories; activating a target causal path of the causal-based formulation network model based on subscriber input, wherein the target causal path includes: (I) a formulation outcome node that represents a desired formulation outcome of a target physical product, and (II) a sequence of interconnected formulation parameter nodes upstream of the formulation outcome node that each relate to a distinct formulation parameter that impacts the desired formulation outcome of the target physical product; constructing a formulation impact explanation prompt based on the formulation outcome node and the sequence of interconnected formulation parameter nodes of the target causal path; generating, by a large language model, a natural language explanation of the target causal path based on an input of the formulation impact explanation prompt; and surfacing, by the web-based graphical user interface, the natural language explanation of the target casual path, wherein the natural language explanation describes in a formulation-specific manner how changes to one or more formulation parameter nodes of the sequence of interconnected formulation parameter nodes impacts the desired formulation outcome of the target physical product.

BRIEF DESCRIPTION OF THE FIGURES

FIG. 4 illustrates an example product-agnostic formulation metadata schema in accordance with one or more embodiments of the present application;

FIG. 5 illustrates an example populated formulation-insights mapping matrix in accordance with one or more embodiments of the present application.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1.00 Intelligent Product Formulation System

Figure 1:
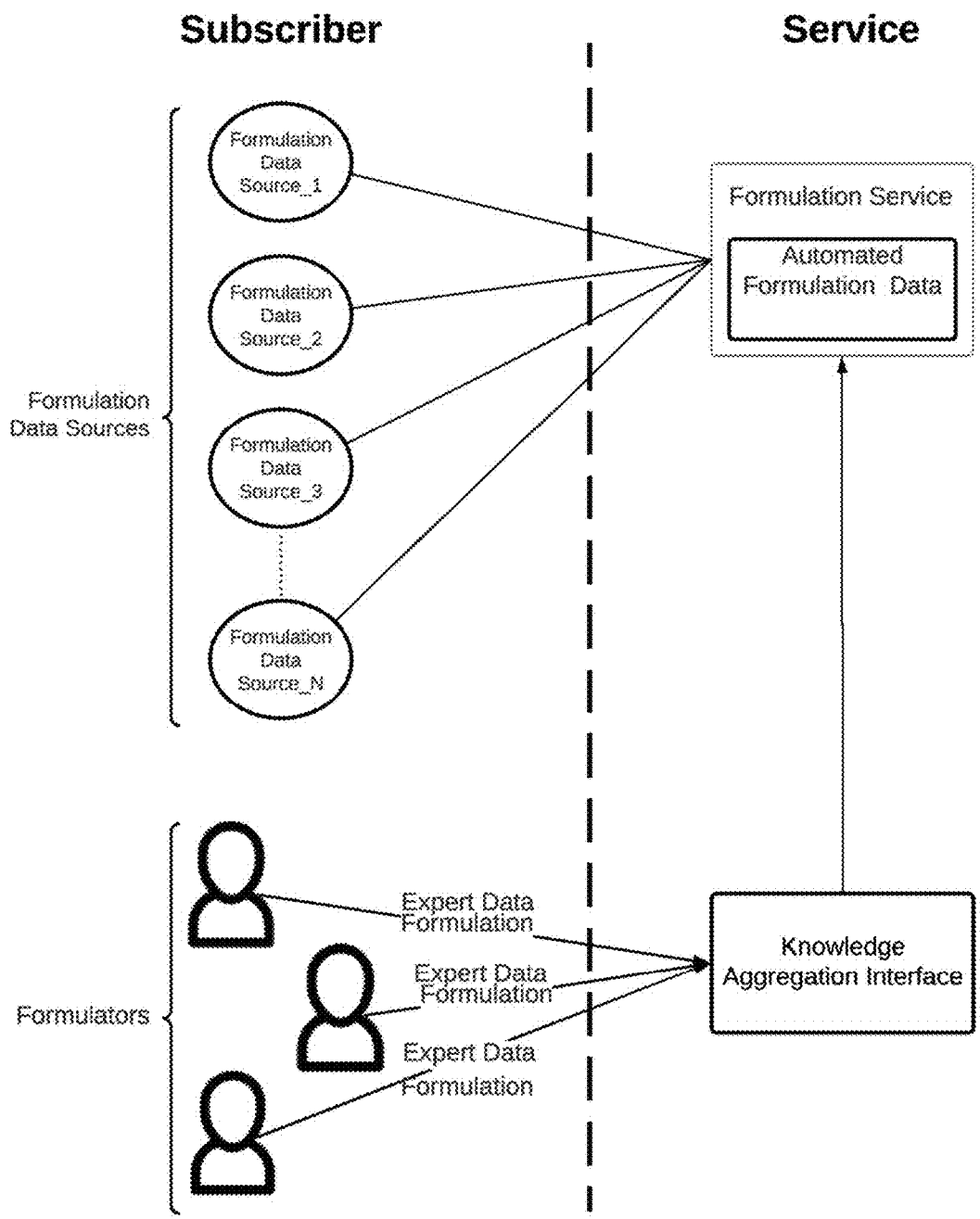
FIG. 1 illustrates a schematic representation of a system 100 in accordance with one or more embodiments of the present application.

As shown in FIG. 1, a system 100 for intelligent product formulations and/or experimentations include a remote formulation service 110 and expert formulation graphical user interface 120.

The remote formulation service 110, which may be referred to herein as the "formulation service", may have an integrated communication connection with a plurality of distinct sources of formulation data and/or product data of a target product. The remote formulation service 110 preferably enables an integration of formulator expertise data together with existing product formulation data and a generation of a visualization of the formulator expertise integrated structure, as will be described in more detail herein.

In one or more embodiments, the remote formulation service 110 includes a plurality of distinct formulation modules that provide enhanced formulation capabilities for intelligently generating one or more formulations of a target product. In such embodiments, the remote formulation service 110 includes an insight explorer module, a lab bench module, and a workspace module. In one embodiment, the insight explorer module may enable formulators and/or subscribers to the formulation service to explore, evaluate, and/or manipulate one or more intelligent formulation tools, such as a quantitative formulation network (e.g., Digital Brain). In one embodiment, the lab bench module may provide one or more formulation tools including, but not limited to, a formulation simulation tool and a formulation optimization tool. In one embodiment, the workspace module may provide a virtual formulation workspace for creating product formulations, executing formulations, and/or storing formulation result data.

The expert formulation graphical user interface 120, which may be sometimes referred to herein as the "expert interface", may be in operable control communication with the remote formulation service 110. In one or more embodiments, the expert interface 120 may include a formulation application programming interface (API) that may be programmatically integrated with one or more APIs of the remote formulation service 110 and one or more APIs of one or more sources of formulation data and/or product data.

Additionally, or alternatively, the system 100 may include a machine learning subsystem (not shown) that may be intelligently configured to assist in automatically generating or setting formulation parameters and/or actively implement simulations and/or optimizations (e.g., for formulation experiments, etc.) of one or more formulations.

Additionally, or alternatively, the machine learning subsystem may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), (generative) adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

Figure 2:
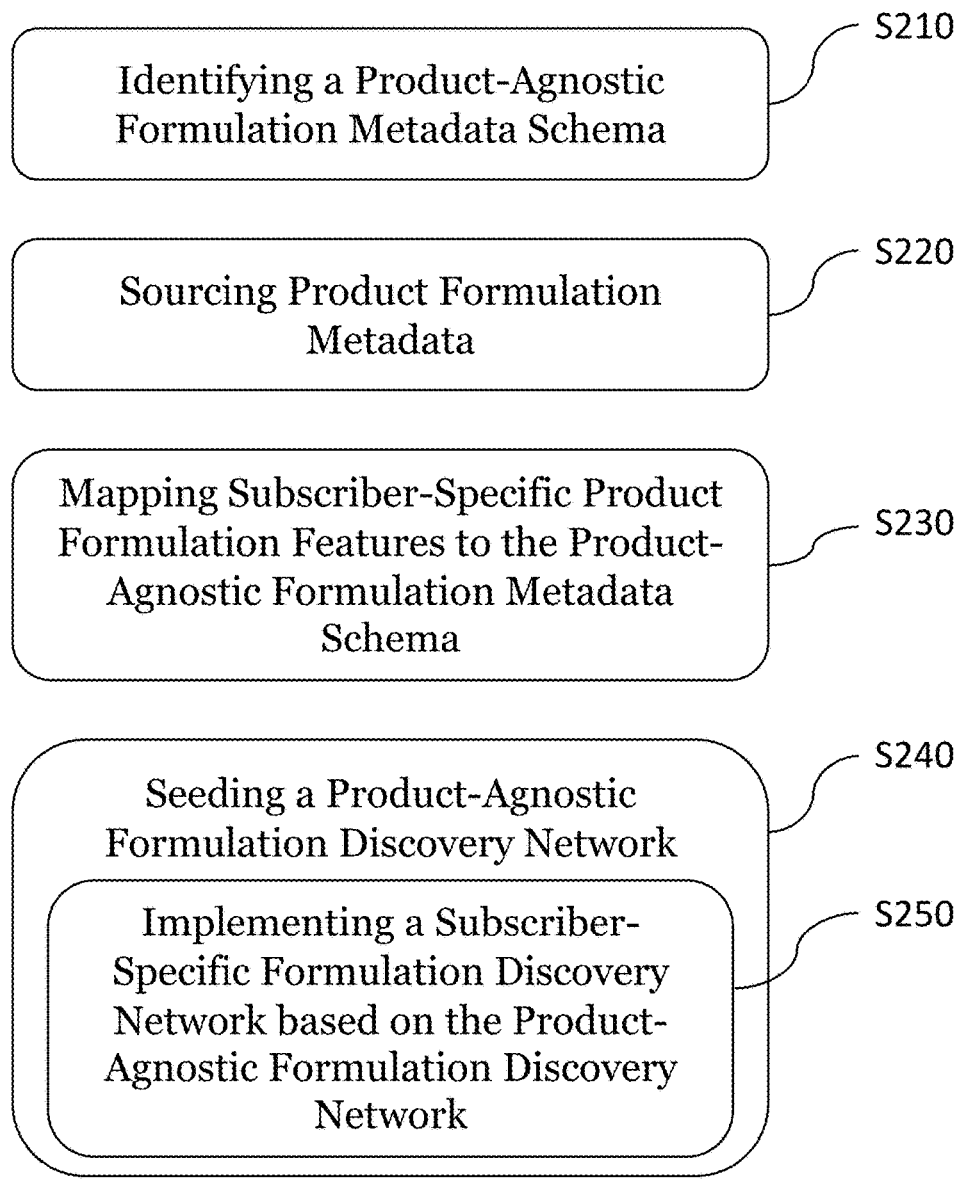
FIG. 2 illustrates an example method 200 in accordance with one or more embodiments of the present application.

2.00 Method for Intelligently Seeding a Subscriber-Agnostic Formulation Network Model As shown in FIG. 2, a method 200 for intelligently seeding a formulation network model includes identifying a product-agnostic formulation metadata schema (S210), sourcing one or more corpora of product formulation metadata from a subscriber (S220), mapping subscriber-specific product formulation features underlying the product formulation metadata to the product-agnostic formulation metadata schema (S230), seeding a formulation discovery network (S240) based on the mapping of S230, and implementing the formulation discovery network (S250).

Method 200, in some embodiments, may be used across multiple industrial and technological realms, including consumer packaged goods (CPG), cosmetics, pharmaceuticals, food and beverages, industrial chemicals, and any other domain where product formulation is critical. Method 200 may provide substantial technical advantages over traditional formulation methods. Unlike traditional approaches that depend heavily on trial and error, method 200 may leverage a product-agnostic formulation metadata schema to intelligently predict impacts of formulation changes. This capability may not only accelerate the development of formulations but also increases the precision with which these models predict real-world outcomes. In sectors where formulation accuracy directly affects product performance, such as in pharmaceuticals or specialty chemicals, method 200's ability to model complex interactions within the formulation can lead to significant advancements in product efficacy and safety.

Specifically, method 200 may implement a universal, product-agnostic formulation metadata schema that encapsulates foundational product knowledge and product formulation interactions. By implementing a universal, product-agnostic formulation metadata schema, models of method 200 can be intelligently seeded to understand complex product behaviors and characteristics. Seeding a model in the matter described by method 200 results in numerous technical advantages. For example, the model(s) of method 200 may require less training data to learn about new products and product formulations. Additionally, the pre-seeded knowledge allows the model(s) of method 200 to make more accurate, stable, and reproducible predictions about product behavior and characteristics than traditional unseeded models (e.g., ensures SCM reliability and validity). It shall be noted that it may be impractical for traditional unseeded models to achieve the performance of the seeded models described herein as it may be impossible for them to learn structural relationships between product formulations.

In other words, the models of method 200 may enable predictive model behavior "out-of-the-box" (e.g., model priors are used to accelerate experimental design and improve predictions with uncertainty quantification (UQ)).

This is contrary to traditional product formulation models (e.g., causal models) that require a user to specify a causal path based on their expertise/assumptions, which often requires deep domain knowledge. This requirement of traditional models can be a significant hurdle, as accurately identifying causal relationships among formulation parameters is not only challenging but highly subjective when left to a user. Method 200 bypasses this need, making it more accessible to a wider range of users. Furthermore, the models of method 200 may also be advantageous when subscriber data is limited. The pre-seeded knowledge in the universal schema may act as a proxy for extensive subscriber data, allowing the models to make meaningful predictions for a subscriber even when the subscriber has no data or a small amount of data.

Additionally, method 200 goes further than seeding the models with complex product formulation data and interactions. Method 200 may enable automated mapping between subscriber data and the universal schema. This mitigates and/or eliminates many subscriber hurdles, including requiring the subscriber to learn or become familiar with the universal, product-agnostic formulation metadata schema, requiring the subscriber to perform tedious, time-consuming, and error-prone manual translations (e.g., mappings) of the subscriber's product formulations to the universal, product-agnostic formulation metadata schema, and/or the like. Not only does the automated mapping performed by method 200 eliminate many subscriber hurdles, but it also significantly reduces the time and resources required for a subscriber to use a system implementing method 200, reduces errors that can skew model predictions, makes method 200 more accessible to a wider range of users by no longer requiring expertise in data mapping/translation, and enables accelerated user discovery of the formulation space ("self-driving discovery").

Furthermore, the models of method 200 enables predictions of likely consumer responses to a new product formulation, rather than explicitly requiring a subscriber to collect feedback from a consumer (e.g., synthetic data generation, goal-achievement forecasting). Acquiring feedback from a consumer is often gathered through surveys or focus groups, which can be expensive, time-consuming, and have low consumer engagement/interest. By training models using the techniques described herein, such models can be used to probabilistically predict likely consumer responses from "fast-acquisition data" that is readily available from earlier development stages (e.g., lab measurements or performance tests). Accordingly, method 200 enables this "fast-acquisition data" to be used as a substitute to the traditional slow-to-acquire feedback methods (e.g., surveys, feedback groups, etc.), allowing for fast iteration and optimization during the product development process.

2.10 Identifying a Product-Agnostic Formulation Metadata Schema

S210, which includes identifying a product-agnostic formulation metadata schema, may function to identify or define a universal formulation metadata schema for generating one or more predictive formulation models. In some embodiments, the product-agnostic formulation metadata schema identified by S210, as generally referred to herein, may relate to a universal data model for digitally representing or modeling products of varying product domains (e.g., product categories) and/or may enable distinct product datasets that are non-uniform or varying to be modeled in a uniform manner. It shall be noted that, in some portions of the disclosure, the product-agnostic formulation metadata schema may be referred to as a "multi-dimensional product-agnostic formulation backbone," "multi-dimensional product-agnostic formulation matrix", or the like.

Product-Agnostic Phenomenological/Functional Groups

In some embodiments, the product-agnostic formulation metadata schema may comprise (or define) one or more product-agnostic phenomenological/functional groups (e.g., functional classes). These one or more product-agnostic phenomenological/functional groups, in some embodiments, may correspond or relate to likely classes with which a feature of a product dataset (e.g., feature, outcome, column, etc.) may be associated. For instance, as generally illustrated in FIG. 4, an example product-agnostic formulation metadata schema may include product-agnostic phenomenological/functional groups named "Computed Quantities," "Chemistry," "Biology," "Morphology," "Taste," "Smell," "Touch," "Sight," and/or "Sound" (among others). It shall be noted that the above example is not intended to be limiting and that a product-agnostic formulation metadata schema may include additional, fewer, or different product-agnostic phenomenological/functional groups without departing from the disclosure contemplated herein, such as stages of formulated product (e.g., pre-mix, during making, in-use properties, after-use benefits).

Additionally, as also illustrated in FIG. 4, in some embodiments, a product-agnostic phenomenological/functional group defined in the product-agnostic formulation metadata schema may be a sub-domain of a higher-order phenomenological/functional group. For instance, as generally illustrated in FIG. 4, the example product-agnostic phenomenological/functional groups "Taste," "Smell," "Touch," "Sight," and "Sound" may be a sub-domain of the product-agnostic phenomenological/functional group "Sensorial."

Furthermore, as also illustrated in FIG. 4, in some embodiments, a product-agnostic phenomenological/functional group defined in the product-agnostic formulation metadata schema may relate to (or be digitally associated with) one or more product-agnostic phenomenological/functional sub-groups. For instance, as generally illustrated in FIG. 4, the example product-agnostic phenomenological/functional group "Chemistry" may relate to the product-agnostic phenomenological/functional sub-groups "chemical_equilibrium" and "chem_preservation." Various non-limiting embodiments of these groups/classes will now be described.

The computed quantities functional class may store formulation parameters of the plurality of formulation parameters that are derived by calculation or measurement (e.g., pH, ionic strength, vapor pressures, activity hydrophilicity/phobicity, etc.). The chemistry functional class may store formulation parameters of the plurality of formulation parameters that relate to chemical properties of the target physical product. The biology functional class may store formulation parameters of the plurality of formulation parameters that are influenced by biological processes. The morphology functional class may store formulation parameters of the plurality of formulation parameters that relate to a physical structure of the target physical product (e.g., phases, emulsions, layers, and/or the like). The taste functional class may store formulation parameters of the plurality of formulation parameters that represent odor properties of the target physical product. The touch functional class may store formulation parameters of the plurality of formulation parameters that represent tactile properties of the target physical product. The sight functional class may store formulation parameters of the plurality of formulation parameters that represent visual properties of the target physical product. Lastly, the sound functional class may store formulation parameters of the plurality of formulation parameters that represent auditory properties of the target physical product.

Product-Agnostic Casual Categories

In some embodiments, the product-agnostic formulation metadata schema may comprise or define one or more product-agnostic casual categories (causal levels) that may collectively form a product-agnostic causal path. The one or more product-agnostic causal categories, in some embodiments, may relate to a likely effect or behavioral outcome of a feature (e.g., parameter, outcome, column) of a product dataset. For instance, as generally illustrated in FIG. 4, the example product-agnostic formulation metadata schema may define a causal path that may include product-agnostic causal categories or levels named "Inputs," "Composition," "Phenomena," "Performance," "Benefit Delivery," "Benefit Assessment," and/or "Satisfaction" at levels 0, 1, 2, 3, 4, 5, and/or 6 along the product-agnostic causal path, respectively. It shall be noted that a respective level succeeding another level may be referred to as the respective level being positioned downstream from the other level. It shall also be noted that the above example is not intended to be limiting, and that a product-agnostic formulation metadata schema may include additional, fewer, or different product-agnostic causal categories without departing from the scope of the disclosure contemplated herein and/or may include additionally, fewer, or different product-agnostic causal categories at a respective level along the product-agnostic causal path without departing from the scope of the disclosure contemplated herein. Various non-limiting embodiments of such causal levels will now be described.

In some embodiments, the "inputs" causal level may be the top-most causal level (e.g., first causal level). In some embodiments, the composition causal level may be may positioned downstream from the "inputs" causal level. The phenomena causal level may be positioned downstream from the composition causal level. The performance causal level may be positioned downstream from the phenomena causal level. The benefit delivery causal level may be positioned downstream from the performance causal level. The benefit assessment causal level may be positioned downstream from the benefit delivery causal level. Lastly, the satisfaction causal level positioned downstream from the benefit assessment causal level.

Furthermore, the inputs causal level may store ingredients and processing variables that are directedly connected to compositional latents of the composition causal level (e.g., surfactants, sweeteners, flavorants, enzymes, emulsifiers, solvents, and/or the like). The composition causal level may store formulation parameters of the plurality of formulation parameters that are deterministic and measurable (e.g. caloric, sodium, carbohydrates, etc.). The phenomena causal level may store formulation parameters of the plurality of formulation parameters that are physically observed (e.g., acid-base equilibria, chemical reactions, phase transitions, etc.). The performance casual level stores may store formulation outcomes of the plurality of formulation outcomes that represent functional efficacy from combined phenomena (e.g., analytical lab measurements). The benefit delivery causal level may store formulation outcomes of the plurality of formulation outcomes that represent use of multiple phenomena to deliver a distinct benefit dimension of a plurality of benefit dimensions (e.g., spreadability, grease removal, etc.). The benefit assessment causal level may store formulation outcomes of the plurality of formulation outcomes that represent psychological perception of one or more of the plurality of benefit dimensions (e.g., sensorial precepts, such as aromaticity, flavor, feel, appearance, sound, etc.). Lastly, the satisfaction causal level may store formulation outcomes of the plurality of formulation outcomes that represent overall user psychological assessment of the target physical product (e.g., cognitive perception and awareness, satisfaction, consumer intent, etc.).

Exemplary Structure of the Product-Agnostic Formulation Metadata Schema

In some embodiments, the product-agnostic formulation metadata schema may be of a tabular format. In one example of such embodiments, as illustrated in FIG. 4, the one or more product-agnostic phenomenological/functional groups (e.g., functional classes) may be arranged along a first dimension of the tabular data structure (e.g., rows) and the one or more product-agnostic casual categories (e.g., causal levels) may be arranged along a second dimension of the tabular data structure (e.g., columns). It shall be noted that the above example is not intended to be limiting, that a product-agnostic formulation metadata schema may be of a different data format, and/or that the one or more product-agnostic phenomenological/functional groups and the one or more or more product-agnostic casual categories may be arranged along different dimensions without departing from the scope of the disclosure contemplated herein. It shall also be noted that, in some embodiments, intersections between the plurality of rows and the plurality of columns may form a plurality of functional class-causal level correlation indices (as also illustrated in FIG. 4).

Stated another way, S210 may implement a universal schema or framework comprising inputs, latent variables, and outcomes capable of representing a vast number of formulated product categories (e.g., any formulated product category). Each such variable, group, or category defined in the universal schema/framework may enable a formulation to be represented as formal first-principles in a physical system model (e.g., the model constructed in S240). Specifically, in some embodiments, formal first-principles of product making, measurement, use, and impact on consumers may be represented as a system of partial differential equations in the physical system model. Additionally, these formal first-principles may represent initial and boundary conditions of the variables, groups, and categories represented in the universal schema/framework. Furthermore, the physical system model constructed via the universal schema/framework may be augmented to include a cognitive/psychometric model that captures how the modeled physical product affects human sensory perceptions and cognitive impressions on awareness, satisfaction, intention, and/or the like.

2.20 Sourcing One or More Corpora of Product Formulation Metadata

S220, which includes sourcing product formulation metadata, may function to source (or collect) one or more formulation metadata files associated with one or more product formulation datasets from a subscriber. It shall be noted that, as generally referred to herein, a product formulation dataset may include one or more formulation data samples (referred to herein as "formulation features" or the like) that correspond to one or more formulation experiments conducted with or involving a target product (e.g., a consumer product, industrial product, physical product, digital product, and/or the like). It shall also be noted that, as generally referred to herein, a formulation metadata file sourced or collected for a target product formulation dataset may include descriptive information (e.g., data) about content included in the target product formulation dataset.

The product formulation metadata and/or the product formulation data, in some portions of the disclosure, may be referred to as "product formulation data." The term "product formulation data," as generally used herein, may refer to any dataset comprising a plurality of formulation parameters and a plurality of formulation outcomes for a target physical product. Each of the plurality of formulation parameters may correspond to a distinct ingredient (or component) used to create the target physical product. Conversely, each of the plurality of formulation outcomes may be influenced by changes to the plurality of formulation parameters.

In some embodiments, the one or more formulation metadata files sourced by S220 may include data indicating a (e.g., ingredient) name associated with one or more columns in a target product formulation dataset, data indicating an abbreviated (e.g., ingredient) name associated with the one or more columns in a target product formulation dataset, data indicating a unique ID associated with the one or more columns in a target product formulation dataset, data indicating a data type associated with the one or more columns in a target product formulation dataset, data indicating a formulation-specific function or outcome associated with the one or more columns in a target product formulation dataset, and/or the like.

Example Formulation Metadata Structure

In some embodiments, the one or more formulation metadata files (e.g., product formulation data) may be of a tabular format. In one example of such embodiments, the rows of a formulation metadata file may correspond to a respective column defined in a target product formulation dataset and the columns of the formulation metadata file may correspond to a distinct attribute/feature of a target column (e.g., ingredient or component of a target physical product).

For instance, in some embodiments, a row of a formulation metafile may correspond to a distinct column in a target product formulation dataset and/or may include data indicating a name of the distinct column, data indicating an abbreviated name of the distinct column, and/or data indicating a formulation-specific function of the distinct column. It shall be noted that the above example is not intended to be limiting and that a formulation metadata file may store data in a different data format/structure without departing from the scope of the invention(s) contemplated herein.

Sourcing Formulation Metadata Files from a Subscriber-||Sourcing Product Formulation Data In some embodiments, product formulation data, such as the one or more formulation metadata files and/or the one or more product formulation datasets, may be sourced from a subscriber (e.g., user). In one example of such embodiments, to source the one or more formulation metadata files from a subscriber, S220 may function to implement one or more graphical user interfaces (GUIs), one or more command line interfaces (CLIs), and/or one or more application programming interfaces (APIs) that may be specifically configured to enable a subscriber to upload/transmit one or more formulation metadata files to a system/service implementing the method 200.

2.30 Mapping Subscriber-Specific Product Formulation Features to the Product-Agnostic Formulation Metadata Schema S230, which includes mapping subscriber-specific product formulation features to the product-agnostic formulation metadata schema, may function to associate (or correlate) one or more formulation features (e.g., formulation parameters and/or formulation outcomes) of the product formulation data with one or more categories defined in the product-agnostic formulation metadata schema identified in S210. In a preferred implementation, S230 may commence based on (or in response to) obtaining an input selecting a user interface button displayed within one or more web-based graphical user interfaces described herein. In turn, using the techniques described herein, S230 may automatically determine and, optionally display in the user interface(s) described herein, placements of the plurality of formulation parameters and the plurality of formulation outcomes within the product-agnostic formulation metadata schema (also referred to as a matrix (or similar recitations) in some portions of the disclosure).

Figure 3:
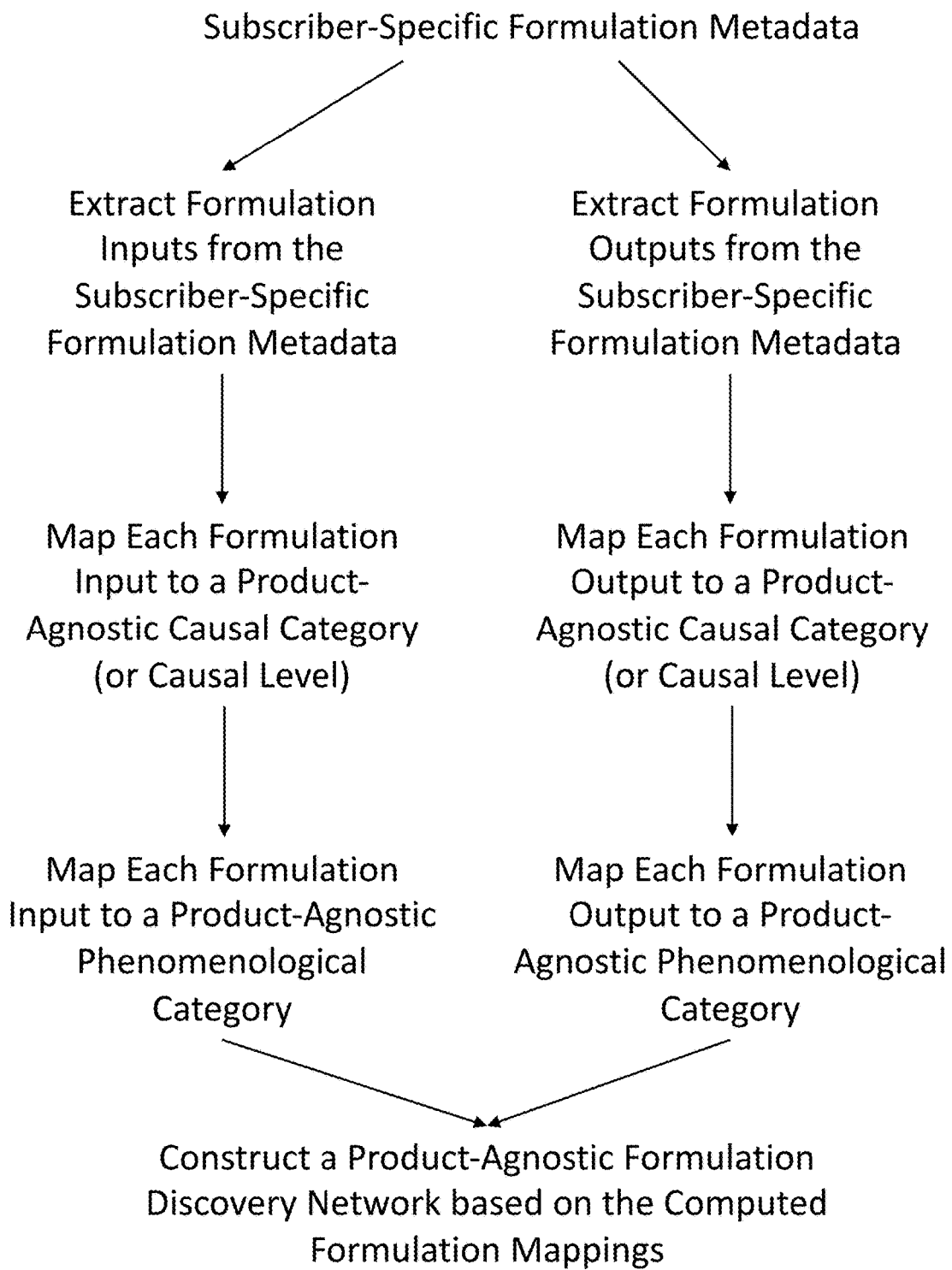
FIG. 3 illustrates an example schematic of mapping product formulation features to a product-agnostic formulation metadata schema in accordance with one or more embodiments of the present application.

In some embodiments, as generally illustrated in FIG. 3, mapping a subject product formulation feature to the one or more categories defined in the product-agnostic formulation metadata schema may include mapping the product formulation feature to at least one product-agnostic phenomenological/functional group defined in the product-agnostic formulation metadata schema and/or may include mapping the product formulation feature to at least one product-agnostic causal category defined in the product-agnostic formulation metadata schema. Specifically, in some embodiments, a result of S230 may be that each of the plurality of formulation parameters and each of the plurality of formulation outcomes are mapped to a distinct functional class-causal level correlation index of the product-agnostic formulation metadata schema (e.g., the index of the schema that intersects or interrelates the phenomenological/functional group and the causal category).

Mapping Product Formulation Features to Phenomenological/Functional Groups

In some embodiments, to map a subject product formulation feature to at least one product-agnostic phenomenological/functional group defined in the product-agnostic formulation metadata schema, S230 may function to identify, from the metadata sourced in S220, a formulation-specific function associated with the subject product formulation feature and/or may compute (e.g., determine) a phenomenological/functional group associated with the formulation-specific function.

In one implementation, to compute (e.g., determine) a phenomenological/functional group associated with the formulation-specific function, S230 may function to implement one or more machine learning models (e.g., large language models, classifiers, etc.). The one or more machine learning models may be specifically configured to receive a formulation-specific function as input and, in turn, compute a formulation class corresponding to the formulation-specific function as output.

Thus, in such an implementation, to map (e.g., classify) the one or more product formulation features (e.g., parameters and/or outcomes) defined in the one or more product formulation datasets to one or more phenomenological/functional groups, S230 may function to provide, sequentially or in bulk, the one or more product formulation features as input to the one or more machine learning models. In turn, the one or more machine learning models may function to compute a formulation/functional class corresponding to each of the one or more formulation features provided as input.

Furthermore, in some embodiments, mapping a subject product formulation feature to at least one product-agnostic phenomenological/functional group may include querying a product formulation lexicon based on the output generated by the above-described machine learning model(s). The product formulation lexicon, in some embodiments, may include one or more entries or mappings that correlate formulation classes to their associated phenomenological group. Thus, in one example of such embodiments, querying the product formulation lexicon based on the formulation class predicted for a product formulation feature may cause S230 to return, as a result to the query, one or more phenomenological group(s) digitally mapped to the formulation class.

Accordingly, in some embodiments, to map the one or more product formulation features defined in the one or more product formulation datasets identified in S220 to one or more product-agnostic phenomenological/functional groups, S230 may function to query the product formulation lexicon based on the formulation class inferences produced for the one or more product formulation features and/or identify, based on results of the query, one or more product-agnostic phenomenological group(s) associated with each of the product formulation features.

Mapping Product Formulation Features to Product-Agnostic Causal Categories

In some embodiments, to map (e.g., classify) a subject product formulation feature to at least one product-agnostic causal category defined in the product-agnostic formulation metadata schema, S230 may function to identify, from the product formulation metadata sourced in S220, a formulation-specific function associated with the subject product formulation feature and/or may compute (e.g., determine) a product-agnostic causal category associated with the formulation-specific function.

In one implementation, to compute (e.g., determine) a product-agnostic causal category associated with the formulation-specific function, S230 may function to implement one or more machine learning models (e.g., large language models, classifiers, etc.). The one or more machine learning models may be specifically configured to receive a formulation-specific function as input and, in turn, compute a causal category corresponding to the formulation-function provided as output.

Thus, in such an implementation, to map the one or more product formulation features defined in the one or more product formulation datasets (identified in S220) to one or more product-agnostic causal categories, S230 may function to provide, sequentially or in bulk, the one or more product formulation features as input to the one or more machine learning models. In turn, the one or more machine learning models may function to compute a causal category (e.g., causal level) corresponding to each of the one or more formulation features provided as output.

Furthermore, in some embodiments, mapping a subject product formulation feature to at least one product-agnostic causal category may include querying a product formulation lexicon based on the output generated by the above-described machine learning model(s). The product formulation lexicon, in some embodiments, may include one or more entries or mappings that correlate to their associated causal category (and/or causal level). Thus, in one example of such embodiments, querying the product formulation lexicon based on the formulation-functional class predicted for a product formulation feature may cause S230 to return, as a result to the query, the causal category (and/or causal level) digitally mapped to the formulation class.

Accordingly, in such embodiments, to map the one or more product formulation features defined in the one or more product formulation datasets to one or more product-agnostic causal categories, S230 may function to query the product formulation lexicon based on the formulation class inferences produced for the one or more product formulation features and/or identify, based on results of the query, one or more product-agnostic causal categories (and/or levels) digitally mapped to each of the product formulation features.

Surfacing the Predicted Formulation Mappings

In some embodiments, the formulation mappings computed for the one or more formulation features may be surfaced to a subscriber (e.g., user) for confirmation or modification. In one example of such embodiments, surfacing the predicted formulation mappings to the subscriber may include surfacing the formulation mappings via a formulation insights graphical user interface. The formulation insights graphical user interface, in some embodiments, may include a formulation-insights mapping matrix that visually indicates the predicted formulation mappings for (e.g., each of) the one or more product formulation features defined in the one or more product formulation datasets.

Figure 5:
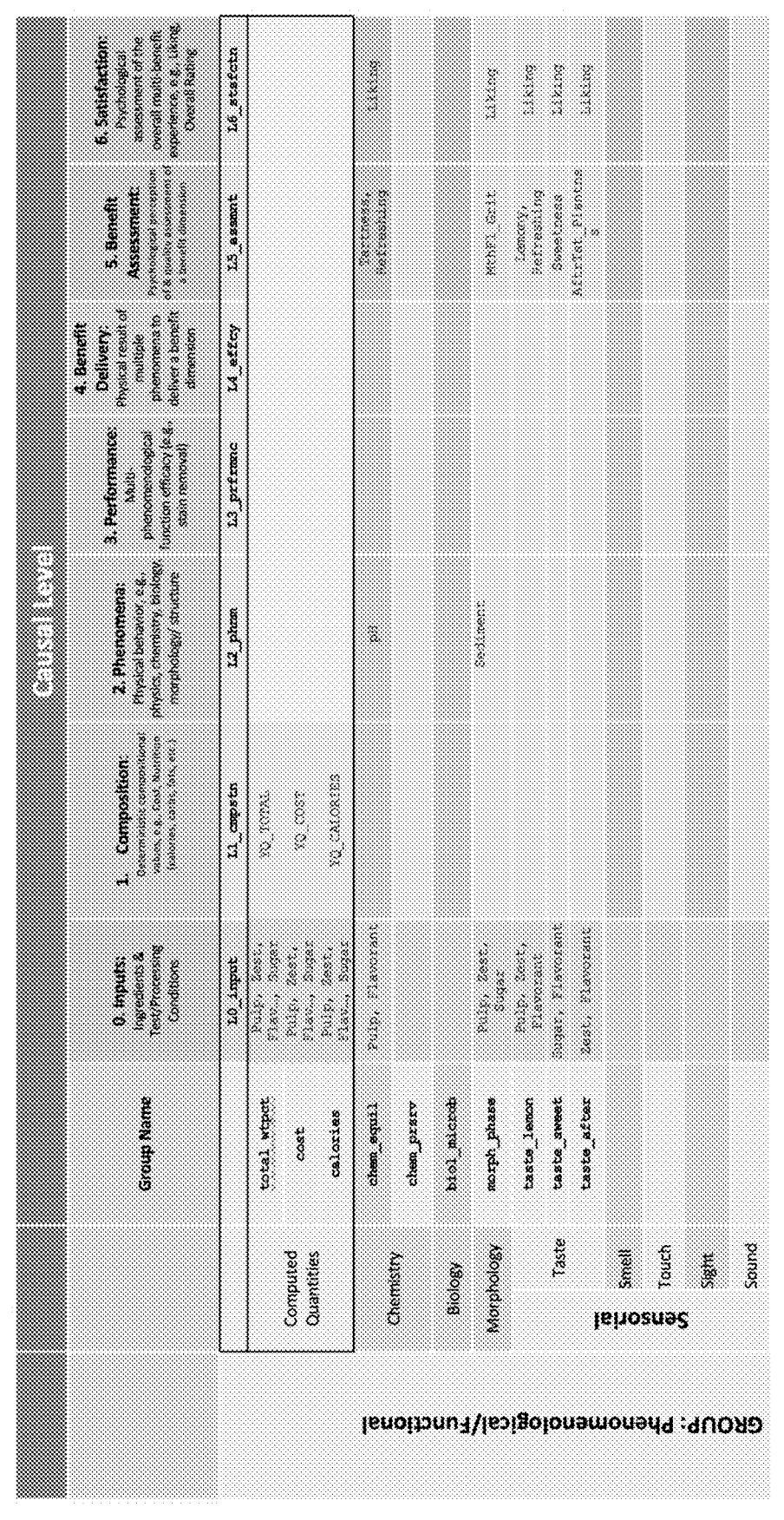

The formulation-insights mapping matrix, in some embodiments, as generally illustrated in FIG. 5, may include (e.g., list) the product-agnostic phenomenological/functional groups defined in the product-agnostic formulation metadata schema along a first dimension (row) and/or may include (e.g., list) the product-agnostic casual categories defined in the product-agnostic formulation metadata schema along a second dimension (column).

Additionally, or alternatively, in some embodiments, the formulation-insights mapping matrix may include one or more subscriber-modifiable cells (e.g., functional class-casual level correlation indices or the like). The one or more subscriber-modifiable cells, as generally illustrated in FIG. 5, may correspond to or be associated with a distinct product-agnostic phenomenological group and a distinct product-agnostic causal category. Furthermore, as also illustrated in FIG. 5, in some embodiments, the one or more subscriber-modifiable cells may be configured to store one or more formulation features.

For instance, as illustrated in the example formulation-insights mapping matrix in FIG. 5, the example formulation-insights mapping matrix may include a plurality of subscriber-modifiable cells, including (among others) a subscriber-modifiable cell that includes example product formulation features "Pulp," "Zest," and "Sugar" mapped to the product-agnostic phenomenological group "Morphology" and the product-agnostic casual category "Inputs," a subscriber-modifiable cell that includes example product formulation feature "Sediment" mapped to the product-agnostic phenomenological group "Morphology" and the product-agnostic casual category "Phenomena," and a subscriber-modifiable cell that includes example product formulation feature "Liking" mapped to the product-agnostic phenomenological group "Satisfaction."

In some embodiments, the user interface(s) used by S230 may be configured to receive subscriber input for repositioning or modifying a location/position of a product formulation feature in the formulation-insights mapping matrix and, in turn, modify the formulation-insights mapping matrix based on the input. In one example of such embodiments, such input received may correspond to a request to remove a product formulation feature from a subscriber-modifiable data cell, insert a product formulation feature at a target subscriber-modifiable data cell, move a product formulation feature from a respective subscriber-modifiable data cell to a target subscriber-modifiable data cell, and/or the like.

Determining Placement of Formulation Features within the Multi-Dimensional Product-Agnostic Formulation Backbone Stating the aforementioned examples another way, in some embodiments, S230 may automatically determine placement of the product formulation features within the multi-dimensional product-agnostic formulation backbone. In one implementation, S230 may function to determine a placement for a plurality of formulation parameters and/or a plurality of formulation outcomes using a pre-defined lexicon. In such embodiments, determining a placement of a respective formulation parameter may include extracting properties and relationships of the target formulation parameter from a pre-defined formulation lexicon. In turn, S230 may classify the target formulation parameter to a target functional class of the plurality of functional classes based on the properties and relationships extracted for the target formulation parameter. Analogously, S230 may also classify the target formulation parameter to a target causal level of the plurality of causal levels based on the properties and relationships extracted for the target formulation parameter.

Analogously, in some embodiments, determining placement of a target formulation outcome of the plurality of formulation outcomes may include extracting properties and relationships of the target formulation outcome from a pre-defined formulation lexicon. In turn, S230 may classify the target formulation outcome to a target functional class of the plurality of functional classes based on the properties and relationships extracted for the target formulation outcome. Furthermore, S230 may also classify the target formulation outcome to a target causal level of the plurality of causal levels based on the properties and relationships extracted for the target formulation outcome.

Additionally, or alternatively, in a second implementation, S230 may use a large language model to determine placement of the product formulation features within the multi-dimensional product-agnostic formulation backbone. In such an implementation, S230 may automatically determine a placement for a plurality of formulation parameters and/or a plurality of formulation outcomes. Determining a placement of a target formulation parameter of the plurality of formulation parameters and/or a target formulation outcome of the plurality of formulation outcomes may include automatically determining, via the large language model, a target casual level of the plurality of causal levels for the target formulation parameter and/or the target formulation outcome. Additionally, determining the placement of the target formulation parameter and/or the target formulation outcome may also include determining, via the large language model, a target functional class of the plurality of functional classes for the target formulation parameter and/or target formulation outcome.

Furthermore, in a third implementation, automatically determining placement of the plurality of formulation parameters may include utilizing a classification algorithm to classify the plurality of formulation parameters into functional classes. In turn, S230 may also derive likely phenomena affected by each functional class of ingredients utilizing (e.g., based on) outputs of the classification algorithm.

2.40 Seeding a Formulation Discovery Network

S240, which includes seeding a formulation discovery network, may function to seed or generate a formulation discovery network based on the product-agnostic formulation metadata schema and/or based on the formulation mappings computed in S230. In some embodiments, a formulation discovery network, once seeded, may comprise one or more formulation nodes that correspond to the one or more product formulation features (identified in S220) and/or may comprise one or more formulation edges that indicate a causal relationship amongst the formulation nodes. Additionally, or alternatively, in some embodiments, S240 may seed or generate the formulation discovery network model based on the placements of the plurality of formulation parameters and the plurality of formulation outcomes within the multi-dimensional product-agnostic formulation backbone described herein.

Implementing (or Executing) a Structural Causal Model (SCM) Algorithm

In some embodiments, seeding the formulation discovery network may be based on S240 providing, to a structural causal model (SCM) algorithm, an input comprising the one or more product formulation features identified in S220; the computed mappings between the product formulation features and their associated product-agnostic phenomenological/functional group(s); the computed mappings between the product formulation features and their associated product-agnostic causal category/causal level; the functional class-causal level correlation indices mapped to the plurality of formulation parameters and the plurality of formulation outcomes; and/or the established causal relationships between the functional class-causal level correlation indices within the multi-dimensional product-agnostic formulation backbone. It shall be noted that this input may be provided in any suitable data structure or manner including, but not limited to, a list-like data structure, a dictionary-like data structure, an XML-based data structure, a JSON-based data structure, a CSV-based data structure, and/or the like.

Figure 6:
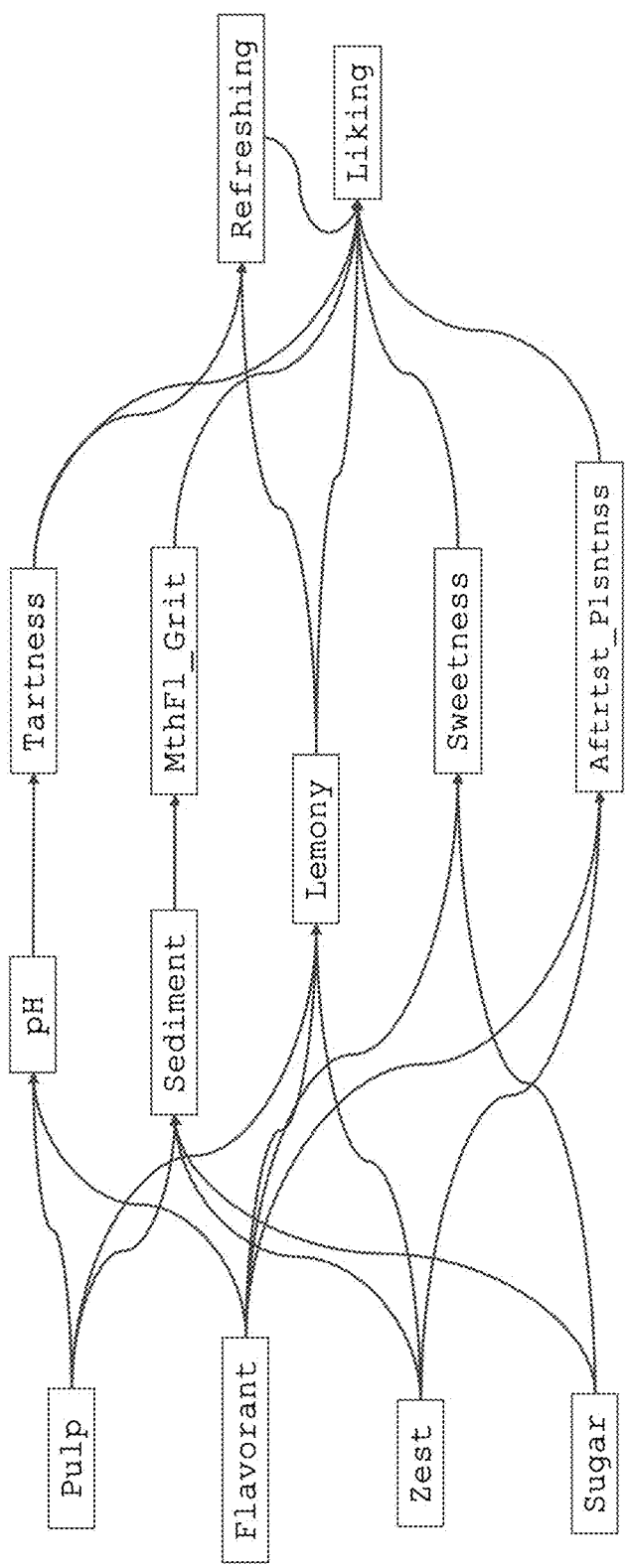
FIG. 6 illustrates an example product-agnostic formulation discovery network in accordance with one or more embodiments of the present application.

In some embodiments, based on the SCM algorithm receiving the above-described input(s), the SCM algorithm may function to generate, as output, a causal-based network graph as generally illustrated in FIG. 6 (also referred to as causal-based formulation network model, formulation discovery network, causal formulation model, or the like). The causal-based network graph, in some embodiments, may be a directed acyclic graph (DAG) that comprises one or more formulation parameter nodes corresponding to the one or more product formulation features identified in S220 and/or may comprise one or more formulation outcome nodes. Additionally, as illustrated in FIG. 6, the causal-based network graph may also include a plurality of causal paths. A causal path, as generally used herein, may represent a sequential or interconnected flow of causality between a group of one or more formulation parameter nodes and a group of one or more formulation outcome nodes. Components of the causal-based network graph may further include parameters, such as probability density/mass functions that represent conditional probability distributions of each effect variable ("child node") given their direct causes ("parent nodes").

Stated another way, in some embodiments, seeding the causal formulation model in the manner described herein may cause the causal formulation model to include domain knowledge about how ingredients and processing conditions (referred to as "inputs") causally affect formulation product properties, performance, and benefits delivered to consumers (referred to as "outcomes"). Specifically, in some embodiments, the causal formulation model may capture such domain knowledge via a network of unmeasured endogenous variables (latent constructs) that represent underlying physical and cognitive constructs of the causal mechanisms of (i) ingredient characterization; (ii) product making composition, morphology/structure, and phenomenological transformation; (iii) in use performance/efficacy; and (iv) after-use benefits. It shall be noted that the technical advantages of the causal formulation model may be based on the universal framework described in S210 that represents inputs, latent variables, and outcomes that are capable of universally representing a formulated product category.

Specifically, in some embodiments, a causal path may inform how changes to one formulation node (e.g., formulation parameter node or formulation outcome node) may casually influence another formulation node. Together, the plurality of causal paths model cause-and-effect relationships within a formulation process, which in turn, facilitates deeper understanding of factors driving product formulation decisions and outcomes. It shall be noted that, in some portions of the disclosure, data included within the causal-based network graph may be referred to as product formulation knowledge data (or the like). That is, the product formulation knowledge data may include or establish a plurality of causal paths between a plurality of formulation parameter nodes and a plurality of formulation outcome nodes across a diverse of product categories (e.g., CPG categories, general product categories (e.g., Detergent/Cleanser or Food/Beverage model), bespoke customer product category).

It shall be noted that, in some embodiments, the one or more formulation edges may have been generated, by the SCM algorithm, based on the provided mappings between the product formulation features and their associated product-agnostic phenomenological/functional group(s) and/or based on the provided mappings between the product formulation features and their associated product-agnostic causal category/causal level. It shall also be noted that, in some embodiments, S240 may function to construct (and/or surface) the formulation discovery network in one or more ways described in U.S. patent application Ser. No. 17/978, 960, which is incorporated in its entirety by this reference.

For example, in some embodiments, the causal-based network may be displayed within a web-based graphical user interface of a formulation service. While displaying the causal-based network in the web-based graphical user interface, S240 may receive subscriber input for activating a target causal path of the causal-based formulation network model. The target causal path that may be activated by S240 may include, but should not be limited to, a formulation outcome node that represents a desired formulation outcome of a target physical product and a sequence of interconnected formulation parameter nodes upstream of the formulation outcome node that each relate to a distinct formulation parameter that impacts the desired formulation outcome of the target physical product.

In some embodiments, activating a target causal path may include increasing a (e.g., visual) prominence of the target causal path relative to the plurality of additional causal paths also included in the causal-based formulation network model. Examples of S240 increasing the prominence of the target causal path may include, but should not be limited to, employing visual enhancements such as bold fonts, distinct colors, or highlighting. Additionally, adjustments in size proportions may be made to render the target causal path larger compared to others, while dynamic effects like animation or flashing may be incorporated to attract user attention. Furthermore, strategic positioning within the model, the addition of descriptive labels or annotations, and the implementation of interactive features may also be used to emphasize the target causal path. Lastly, in some embodiments, audiovisual cues, contrast adjustments, and temporary visibility enhancements when the path becomes relevant may also be used as techniques for increasing the prominence of the target causal path.

In some embodiments, S240 may function to construct a formulation impact explanation prompt for the target causal path activated by a subscriber. The formulation impact explanation prompt, in some embodiments, may be constructed based on one or more formulation outcome nodes and a sequence of interconnected formulation parameter nodes associated with the target causal path. The term "formulation impact explanation prompt," as generally used herein, may refer to a prompt that instructs a large language model (LLM) to produce a natural language explanation of how changes to one or more formulation parameter nodes causally impact the one or more formulation outcomes nodes.

In some embodiments, S240 may provide the formulation impact explanation prompt to a large language model (LLM) as input. The large language model, in some embodiments, may be a machine learning model that is capable of processing natural language input for various linguistic tasks. For instance, in a non-limiting example, the large language model may be a GPT model (Generative Pre-trained Transformer), a BERT model (Bidirectional Encoder Representations from Transformers), a LLaMA model (Large Language Model Meta AI), a Whisper model of Open AI of San Francisco, California, USA, or any other suitable language model.

In some embodiments, based on receiving the formulation impact explanation prompt as input, the large language model may output (e.g., generate) a natural language explanation of the target causal path. Additionally, or alternatively, in some embodiments, S240 may function to surface via a same graphical user interface displaying the causal-based formulation network model (or via a different graphical user interface), the natural language explanation of the target causal path. Specifically, in some embodiments, the natural language explanation may describe, in a formulation-specific manner, how changes to one or more formulation parameter nodes of a sequence of interconnected formulation parameter nodes impacts the desired formulation outcome of the target physical product. Additionally, or alternatively, in such embodiments, the natural language explanation may include insights into the implications of domain knowledge integration and answer questions, such as "Where have we been?", "What does it mean and tell us where to go next?", and/or the like. The natural language explanation may also include the mechanisms and prioritization of input variables (e.g., ingredients and processing) as decision variables for how to achieve any goal expressed in terms of desirability of outcomes. Further, the natural language explanation may also include rational for adaptive-learning generated formulations and explanations (e.g., hypotheses backed by evidence) of experimental outcomes. Lastly, in some embodiments, the natural language explanation may combine the above question types and their answers into concise artifacts (e.g., dashboards, reports, presentations, etc.) that can be leveraged by users to document work, prioritize their activities, and support project-making decisions (e.g., launch decisions, consumer testing, etc.).

With reference to the implementations described in S230, in some embodiments, generating the causal-based formulation work model may include automatically constructing input-to-phenomena connections by associating the functional classes predicted for the plurality of formulation parameters with corresponding likely phenomena. Additionally, generating the causal-based formulation work model may include adding the input-to-phenomena connections to the causal-based formulation network model and/or presenting the causal based formulation network model, including the input-to-phenomena connections, via one or more the graphical user interface described herein.

Adapting the Formulation Discovery Network to a Product-Specific Formulation Network In some embodiments, S240 may function to tune or adapt the formulation discovery network from a product-agnostic (or subscriber-agnostic) formulation discovery network to a product-specific (or subscriber-specific) formulation discovery network. In one example of such embodiments, to adapt a product-agnostic (or subscriber-agnostic) formulation discovery network to a product-specific (or subscriber-specific) formulation discovery network, S240 may function to provide new product formulation data and/or experimentation data to the SCM algorithm described above.

In some embodiments, the new product formulation data and/or the experimentation data may be sourced from a subscriber (e.g., user). In one example of such embodiments, to source the new product formulation data and/or the experimentation data from the subscriber, S240 may function to implement one or more graphical user interfaces (GUIs), one or more command line interfaces (CLIs), and/or one or more application programming interfaces (APIs) that may be specifically configured to enable a subscriber to upload/transmit one or more corpora of formulation data to a system/service implementing the method 200.

In some embodiments, based on providing the new product formulation data and/or experimentation data to the SCM algorithm, the SCM algorithm may function to perform one or more statistical-based tests and, in turn, dynamically update (e.g., modify or tune) the formulation discovery network based on the results of the one or more statistical tests. In one example of such embodiments, dynamically updating the formulation discovery network may include updating the one or more formulation nodes in the formulation discovery network (e.g., adding one or more new formulation nodes, removing one or more existing formulation nodes, and/or the like) and/or may include updating the one or more formulation edges in the formulation discovery network (e.g., adding one or more new formulation edges, removing one or more existing formulation edges, and/or the like). Additionally, or alternatively, in some embodiments, dynamically updating the formulation discovery network may include adding one or more causal paths to the casual-based formulation work model and/or removing a subset of the plurality of causal paths from the causal-based formulation network model.

Formulation Simulation|Formulation Optimization

Additionally, or alternatively, in some embodiments, S240 may comprise S250 that functions to implement the formulation discovery network to enable one or more operations of an automatic formulation and/or a semi-automatic formulation service. In one example of such embodiments, the formulation discovery network may interface and/or be integrated with a plurality of distinct formulation modules including, but not limited to, a formulation simulation module, an optimization module, and/or the like (as described in the system 100). In such an example, the formulation simulation module may communicate a simulation objective to the formulation discovery network, which may, in turn, cause the formulation discovery network to return simulation parameters for implementing or executing one or more computer-implemented formulation simulations for a target product. Similarly, the optimization module may function to communicate parameters to be optimized for a target formulation and in response, the formulation discovery network may function to return optimization parameters or the like for creating an objective function for initializing an optimization.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for generating natural language explanations of product formulations, the computer-implemented method comprising:
    implementing, by one or more computer processors, a causal-based formulation network model within a web-based graphical user interface of a formulation service, wherein the causal-based formulation network model comprises product formulation knowledge data that establishes a plurality of causal paths between a plurality of formulation parameter nodes and a plurality of formulation outcome nodes across a diverse set of product categories;
    activating a target causal path of the causal-based formulation network model based on subscriber input, wherein the target causal path includes:
        (I) a formulation outcome node that represents a desired formulation outcome of a target physical product, and
        (II) a sequence of interconnected formulation parameter nodes upstream of the formulation outcome node that each relate to a distinct formulation parameter that impacts the desired formulation outcome of the target physical product;
    constructing, by the one or more computer processors, a formulation impact explanation prompt based on the formulation outcome node and the sequence of interconnected formulation parameter nodes of the target causal path;
    generating, by the one or more computer processors executing a large language model, a natural language explanation of the target causal path based on an input of the formulation impact explanation prompt; and
    surfacing, by the web-based graphical user interface, the natural language explanation of the target casual path, wherein the natural language explanation describes in a formulation-specific manner how changes to one or more formulation parameter nodes of the sequence of interconnected formulation parameter nodes impacts the desired formulation outcome of the target physical product.

2. The computer-implemented method according to claim 1, further comprising:

obtaining product formulation data comprising a plurality of formulation parameters and a plurality of formulation outcomes for the target physical product;

automatically mapping each of the plurality of formulation parameters and each of the plurality of formulation outcomes to a distinct functional class-causal level correlation index of a multi-dimensional product-agnostic formulation backbone; and seeding the causal-based formulation network model based on:
(A) functional class-casual level correlation indices mapped to the plurality of formulation parameters and the plurality of formulation outcomes, and
(B) established causal relationships between the functional class-casual level correlation indices within the multi-dimensional product-agnostic formulation backbone.

3. The computer-implemented method according to claim 2, wherein automatically mapping each of the plurality of formulation parameters and each of the plurality of formulation parameters includes:

classifying, by one or more machine learning models, each of the plurality of formulation parameters and each of the plurality of formulation outcomes to a distinct functional class of the multi-dimensional product-agnostic formulation backbone, classifying, by one or more machine learning models, each of the plurality of formulation parameters and each of the plurality of formulation outcomes to a distinct casual level of the multi-dimensional product-agnostic formulation backbone, and mapping each of the plurality of formulation parameters and each of the plurality of formulation outcomes to the distinct functional class-causal level correlation index that interrelates the distinct functional class and the distinct casual level associated with each of the plurality of formulation parameters and each of the plurality of formulation outcomes.

4. The computer-implemented method according to claim 2, wherein:

the multi-dimensional product-agnostic formulation backbone comprises:
(i) a plurality of rows that each correspond to a distinct functional class of a plurality of functional classes, and
(ii) a plurality of columns that each represent a causal level of a plurality of causal levels; and
intersections between the plurality of rows and the plurality of columns form a plurality of functional class-causal level correlation indices.

5. The computer-implemented method according to claim 4, wherein the plurality of casual levels of the multi-dimensional product-agnostic formulation backbone comprises:
(a) a composition causal level,
(b) a phenomena causal level positioned downstream from the composition causal level,
(c) a performance causal level positioned downstream from the phenomena causal level,
(d) a benefit delivery causal level positioned downstream from the performance causal level,
(e) a benefit assessment causal level positioned downstream from the benefit delivery causal level, and
(f) a satisfaction causal level positioned downstream from the benefit assessment causal level.

6. The computer-implemented method according to claim 5, wherein:

the composition causal level stores formulation parameters of the plurality of formulation parameters that are deterministic and measurable, the phenomena causal level stores formulation parameters of the plurality of formulation parameters that are physically observed, the performance casual level stores formulation outcomes of the plurality of formulation outcomes that represent functional efficacy from combined phenomena, the benefit delivery causal level stores formulation outcomes of the plurality of formulation outcomes that represent use of multiple phenomena to deliver a distinct benefit dimension of a plurality of benefit dimensions, the benefit assessment causal level stores formulation outcomes of the plurality of formulation outcomes that represent psychological perception of one or more of the plurality of benefit dimensions, and the satisfaction causal level stores formulation outcomes of the plurality of formulation outcomes that represent overall user psychological assessment of the target physical product.

7. The computer-implemented method according to claim 4, wherein the plurality of rows includes:

a computed quantities functional class row that stores formulation parameters of the plurality of formulation parameters that are derived by calculation or measurement, a chemistry functional class row that stores formulation parameters of the plurality of formulation parameters that relate to chemical properties of the target physical product, a biology functional class row that stores formulation parameters of the plurality of formulation parameters that are influenced by biological processes, a morphology functional class row that stores formulation parameters of the plurality of formulation parameters that relate to a physical structure of the target physical product, a taste functional class row that stores formulation parameters of the plurality of formulation parameters that represent odor properties of the target physical product, a touch functional class row that stores formulation parameters of the plurality of formulation parameters that represent tactile properties of the target physical product, a sight functional class row that stores formulation parameters of the plurality of formulation parameters that represent visual properties of the target physical product, and a sound functional class row that stores formulation parameters of the plurality of formulation parameters that represent auditory properties of the target physical product.

8. The computer-implemented method according to claim 1, further comprising:

receiving product formulation data uploaded by a subscriber, wherein the product formulation data comprises a plurality of formulation parameters and a plurality of formulation outcomes for the target physical product;

obtaining an input selecting a user interface button displayed within the web-based graphical user interface; and automatically determining placement of the plurality of formulation parameters and the plurality of formulation outcomes within a multi-dimensional product-agnostic formulation backbone based on obtaining the input.

9. The computer-implemented method according to claim 8, wherein:
the web-based graphical user interface displays the multi-dimensional product-agnostic formulation backbone and the placement determined for each of the plurality of formulation parameters and each of the plurality of formulation outcomes, and
the web-based graphical user interface is configured to receive input for repositioning one or more of the plurality of formulation parameters and one or more of the plurality of the plurality of formulation outcomes within the web-based graphical user interface.

10. The computer-implemented method according to claim 8, further comprising:
generating the causal-based formulation network model based on the placements of the plurality of formulation parameters and the plurality of formulation outcomes within the multi-dimensional product-agnostic formulation backbone; and
dynamically updating the network model when one or more of the plurality of formulation parameters and one or more of the plurality of the plurality of formulation outcomes are repositioned within the web-based graphical user interface.

11. The computer-implemented method according to claim 10, wherein dynamically updating the network model includes:
adding one or more formulation parameter nodes to the causal-based formulation network model,
removing a subset of the plurality of formulation parameter nodes from the causal-based formulation network model,
adding one or more causal paths to the casual-based formulation work model, and
removing a subset of the plurality of causal paths from the causal-based formulation network model.

12. The computer-implemented method according to claim 8, wherein:
the multi-dimensional product-agnostic formulation backbone comprises a plurality of causal levels positioned along a first dimension and a plurality of functional classes positioned along a second dimension, and
automatically determining placement of a target formulation parameter of the plurality of formulation parameters includes:
extracting properties and relationships of the target formulation parameter from a pre-defined formulation lexicon;
classifying the target formulation parameter to a target functional class of the plurality of functional classes based on the properties and relationships extracted for the target formulation parameter; and
classifying the target formulation parameter to a target causal level of the plurality of causal levels based on the properties and relationships extracted for the target formulation parameter.

13. The computer-implemented method according to claim 8, wherein:
the multi-dimensional product-agnostic formulation backbone comprises a plurality of causal levels positioned along a first dimension and a plurality of functional classes positioned along a second dimension, and
automatically determining placement of a target formulation outcome of the plurality of formulation outcomes includes:
extracting properties and relationships of the target formulation outcome from a pre-defined formulation lexicon;
classifying the target formulation outcome to a target functional class of the plurality of functional classes based on the properties and relationships extracted for the target formulation outcome; and
classifying the target formulation outcome to a target causal level of the plurality of causal levels based on the properties and relationships extracted for the target formulation outcome.

14. The computer-implemented method according to claim 8, wherein:
the multi-dimensional product-agnostic formulation backbone comprises a plurality of causal levels positioned along a first dimension and a plurality of functional classes positioned along a second dimension, and
automatically determining placement of a target formulation parameter of the plurality of formulation parameters includes:
automatically determining, via the large language model, a target casual level of the plurality of causal levels for the target formulation parameter; and
automatically determining, via the large language model, a target functional class of the plurality of functional classes for the target formulation parameter.

15. The computer-implemented method according to claim 14, wherein:
automatically determining placement of a target formulation outcomes of the plurality of formulation outcomes includes:
automatically determining, via the large language model, a target casual level of the plurality of causal levels for the target formulation outcome; and
automatically determining, via the large language model, a target functional class of the plurality of functional classes for the target formulation outcome.

16. The computer-implemented method according to claim 8, wherein:
automatically determining the placement of the plurality of formulation parameters and the plurality of formulation outcomes at least includes:
utilizing a classification algorithm to classify the plurality of formulation parameters into functional classes; and
deriving likely phenomena affected by each functional class of ingredients based on outputs of the classification algorithm,
the computer-implemented method further comprising:
generating the causal-based formulation network model based on the placement of the plurality of formulation parameters and the plurality of formulation outcomes within the multi-dimensional product-agnostic formulation backbone, wherein generating the causal-based formulation network model at least includes:
automatically constructing input-to-phenomena connections by associating the functional classes with corresponding likely phenomena;
adding the input-to-phenomena connections to the causal-based formulation network model; and
presenting the causal-based formulation network model, including the input-to-phenomena connections, within the web-based graphical user interface.

17. The computer-implemented method according to claim 1, wherein:
  each of the plurality of formulation parameters corresponds to a distinct ingredient used to create the target physical product, and
  each of the plurality of formulation outcomes is influenced by changes to the plurality of formulation parameters.

18. The computer-implemented method according to claim 1, wherein:
  the causal-based formulation network model includes the target causal path and a plurality of additional causal paths, and
  activating the target causal path includes:
    increasing a prominence of the target causal path relative to the plurality of additional causal paths.

19. The computer-implemented method according to claim 1, further comprising:
  populating a multi-dimensional product-agnostic formulation backbone based on subscriber-uploaded formulation data, and
  seeding the causal-based formulation network model based on the populating of the multi-dimensional product-agnostic formulation backbone, wherein seeding the causal-based formulation network model transforms the causal-based formulation network model from a subscriber-agnostic causal-based formulation network model to a subscriber-specific causal-based formulation network model.

20. A computer-program product comprising a non-transitory machine-readable storage medium storing computer instructions that, when executed by one or more processors, perform operations comprising:
  implementing a causal-based formulation network model within a web-based graphical user interface of a formulation service, wherein the causal-based formulation network model comprises product formulation knowledge that establishes a plurality of causal paths between a plurality of formulation parameter nodes and a plurality of formulation outcome nodes across a diverse set of product categories;
  activating a target causal path of the causal-based formulation network model based on subscriber input, wherein the target causal path includes:
    (I) a formulation outcome node that represents a desired formulation outcome of a target physical product, and
    (II) a sequence of interconnected formulation parameter nodes upstream of the formulation outcome node that each relate to a distinct formulation parameter that impacts the desired formulation outcome of the target physical product;
  constructing a formulation impact explanation prompt based on the formulation outcome node and the sequence of interconnected formulation parameter nodes of the target causal path;
  generating, by a large language model, a natural language explanation of the target causal path based on an input of the formulation impact explanation prompt; and
  surfacing, by the web-based graphical user interface, the natural language explanation of the target casual path, wherein the natural language explanation describes in a formulation-specific manner how changes to one or more formulation parameter nodes of the sequence of interconnected formulation parameter nodes impacts the desired formulation outcome of the target physical product.

\* \* \* \* \*